Jan. 12, 1926. 1,569,817
G. W. LEE
PLOW ATTACHMENT
Filed July 28, 1923
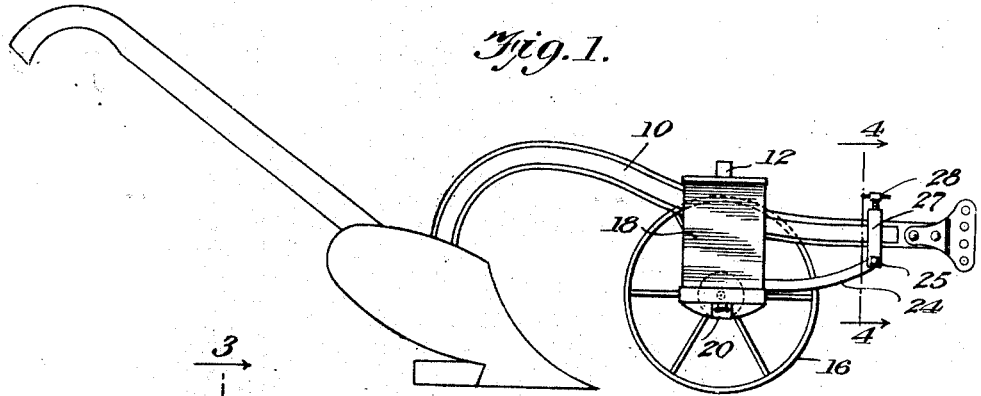
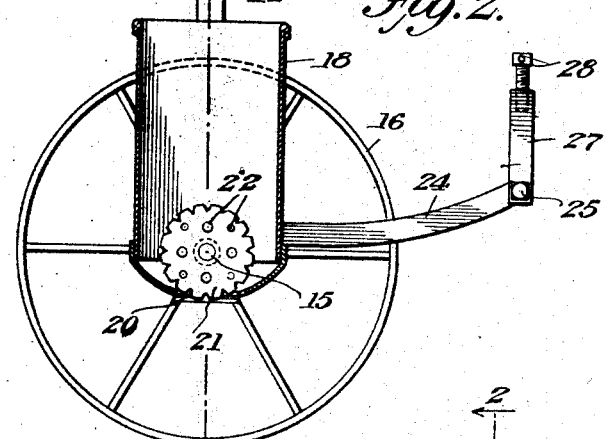
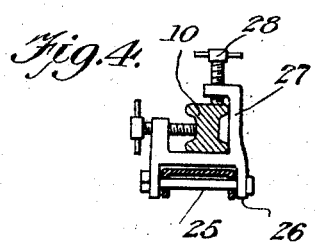
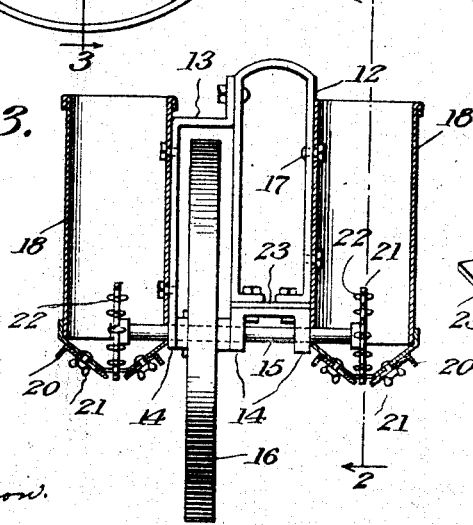
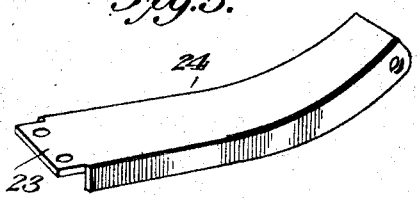
George Willie Lee
INVENTOR
BY Victor J. Evans
ATTORNEY
WITNESS: P. C. Gannon Patented Jan. 12, 1926.

1,569,817

UNITED STATES PATENT OFFICE.

GEORGE WILLIE LEE, OF WILLOW SPRING, NORTH CAROLINA.

PLOW ATTACHMENT.

Application filed July 28, 1923. Serial No. 654,400.

*To all whom it may concern:*

Be it known that I, GEORGE WILLIE LEE, a citizen of the United States, residing at Willow Spring, in the county of Wake and State of North Carolina, have invented new and useful Improvements in Plow Attachments, of which the following is a specification.

This invention relates to improvements in agricultural machines and has for an object the provision of means which may be attached to a plow, cultivator or similar agricultural machine so as to convert the latter into a top dresser, fertilizer distributor, or to provide means for sowing peas, beans or other cover crops.

Another object of the invention is the provision of an attachment of this character which may be used upon one or both sides of a plow or cultivator beam, and may be regulated for the distribution of different materials in different quantities.

Another object of the invention is the provision of a distributor which may be attached to a plow or cultivator in a manner to permit of independent movement of the said plow or cultivator and which will operate advantageously irrespective of the depth of the furrow.

With the above and other objects in view, the invention further includes the following novel features and details of construction, to be hereinafter more fully described, illustrated in the accompanying drawings and pointed out in the appended claim.

In the drawings:—

Figure 1 is a side elevation of a plow with the invention applied.

Figure 2 is a vertical section on the line 2—2 of Figure 3.

Figure 3 is a section taken substantially on the line 3—3 of Figure 2.

Figure 4 is a section on the line 4—4 of Figure 1.

Figure 5 is a detail perspective view of the draw bar.

Referring to the drawings in detail wherein like characters of reference denote corresponding parts, the reference character 10 indicates the beam of a plow, which may be provided with a double breaker plow blade 11.

The invention comprises a frame which includes a beam yoke 12, through which the beam 10 is adapted to pass and further includes a laterally extending inverted substantially L-shaped arm 13. Secured to the lower end of the frame is a substantially U-shaped member providing bearings 14 in which is rotatably mounted an axle 15, while mounted upon this axle is a supporting wheel 16, the latter occupying the space within the arm 13.

Removably secured to the frame by means of bolts or other fastening devices 17, are hoppers 18, the latter being provided with inclined bottoms having discharge openings 19 therein. The size of these openings may be regulated by means of slides 20 which are adjustably held in position as shown at 21. Thus, the openings may be regulated to distribute in any desired quantity, fertilizer or seed. Mounted upon the ends of the axle 15 are agitator disks 21 which have extending laterally therefrom lugs 22 so that the material within the hoppers will be agitated by the operation of the axle 15.

Secured to the frame (that is to the lower part of the yoke 12) is the inner end 23 of a draw bar 24, the said end serving to connect the lower ends of the yoke. This draw bar is channel-shaped in cross section so as to provide increased strength and its forward end is secured by means of a pivot bolt 25, between ears 26 which are carried by a clamp 27. This clamp is provided with clamping arms which receive between them the beam 10, the said arms carrying clamping screws 28 which engage the beam and act to hold the clamp securely in place.

It will be apparent from the foregoing description and accompanying drawings that the invention provides a device which may be easily and quickly secured to the beam of a plow, cultivator or the like and which will permit of independent movement of the said beam without affecting the device. In addition, the attachment will operate irrespective of the depth plowed.

The invention is susceptible of various changes in its form, proportions and minor details of construction and the right is herein reserved to make such changes as properly fall within the scope of the appended claim.

Having described the invention what is claimed is:—

The combination with a plow having a beam, of a seeder attachment comprising a yoke through which the beam passes for a limited vertical movement, a laterally extending inverted substantially L-shaped arm secured to said yoke, an inverted U-shaped member secured to the lower end of the yoke and provided with alined bearings in its legs, a third bearing in the lower extremity of said L-shaped arm, an axle passing through the bearings for rotation therein a wheel fixed on the axle between the third bearing and the U-shaped member, said wheel extending within the space provided by the L-shaped arm, a pair of hoppers carried by the outer ends of said axle and fixed respectively to the yoke and to the L-shaped arm, and means secured to said yoke and extending forwardly parallel with said beam, said means having pivotal connection at its forward end with said beam permitting relative vertical movement of said yoke and preventing relative horizontal movement.

In testimony whereof I affix my signature.

GEORGE WILLIE LEE.